United States Patent Office 3,164,600
Patented Jan. 5, 1965

3,164,600
1 - ARALKYL - 4 - (N - ARYL - CARBONYL AMINO)-
PIPERIDINES AND RELATED COMPOUNDS
Paul A. J. Janssen, Vosselaar, near Turnhout, Belgium,
assignor to Research Laboratorium Dr. C. Janssen,
N.V., Beerse, Belgium, a company of Belgium
No Drawing. Filed Oct. 10, 1961, Ser. No. 144,059
16 Claims. (Cl. 260—293.4)

The present invention relates to a novel group of N-aralkyl-4-piperidyl-N-arylalkanamides. More particularly, it relates to compounds of the general formula:

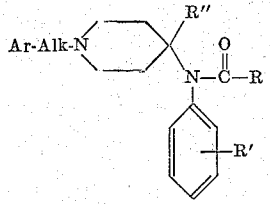

and the pharmaceutically equivalent, non-toxic salts thereof, wherein Ar represents cyclohexyl, phenyl, halophenyl, methoxyphenyl, aminophenyl, nitrophenyl, pyridyl, furyl, or thienyl; Alk represents ethylene or propylene; R represents lower alkyl, lower alkoxy, dimethylamino, cyclopropyl, 1-pyrrolidyl, morpholino or 1-piperidyl; R' represents hydrogen, methyl or methoxy and R" represents hydrogen or lower alkyl radical.

The halophenyl radicals referred to above include fluorophenyl, chlorophenyl, bromophenyl and iodophenyl. The lower alkyl and lower alkoxy radicals referred to contain less than 7 carbon atoms; typical examples are methyl, ethyl, propyl, butyl, methoxy, ethoxy, propoxy and butoxy.

The organic bases of this invention form pharmaceutically acceptable salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds to which this invention relates are useful because of their valuable pharmacological properties. In particular, they are potent analgesics and appetite inhibitors. They are also mydriatic and cholinergic in their action.

The compounds of this invention can be advantageously prepared by the condensation of a compound of the structural formula Ar-Alk-halogen with an appropriately selected compound of the formula

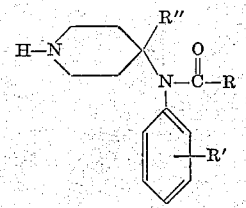

wherein Ar, Alk, R, R', and R" are defined as above. The reaction can be carried in an inert solvent such as an aromatic hydrocarbon (e.g. benzene, toluene), a lower alkanol (e.e. butanol), or a lower alkanone ,e.g. 4-methyl-2-pentanone). The reaction can be accelerated by use of elevated temperatures.

The intermediate piperidines described above can be conveniently prepared by the following series of reactions.

N-benzylpiperidone is reacted with an arylamine to give an intermediate Schiff base of the formula:

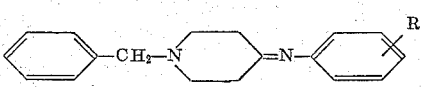

which is reduced to the corresponding diamine with lithium aluminum hydride. Alternatively, these compounds are mixed with an alkyl lithium to give the 4-alkylpiperidine derivative. The resultant compound is reacted with an appropriate anhydride to give the corresponding amide, with an appropriate alkyl chloroformate to give the corresponding urethane or with phosgene to give a carbamyl chloride which is further reacted with a secondary amine to give a urea derivative. The intermediates produced can be represented by the following general formula:

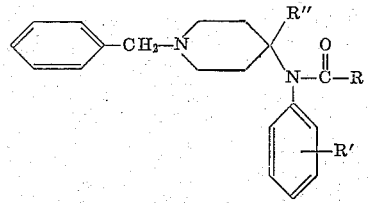

wherein R, R' and R" are defined as above. Debenzylation of the above compound is carried out by hydrogenation over palladium-on-charcoal to give the intermediate described above.

The compounds which constitute this invention and their methods of preparation will appear more fully from a consideration of the following examples, which are given for the purpose of illustration only and are not to be construed as limiting the invention in spirit and in scope. In these examples, quantities are indicated in parts by weight, temperatures in degrees centigrade (° C.), and pressure in millimeters of mercury (mm.).

Example 1

A mixture of 95 parts of 1-benzyl-4-piperidone, 60 parts of aniline, 800 parts of toluene and .05 part of 4-toluenesulfonic acid is refluxed in a vessel provided with a reflux condenser and water separator. After 15 hours, the calculated amount of water is separated and the mixture cooled. The toluene is evaporated and the residue dissolved in 800 parts of diisopropyl ether with stirring. The solution is filtered and the solvent evaporated from the filtrate. The residue is distilled to give N-(1-benzyl-4-piperidylidene)aniline, boiling at 170° C. at 0.05 mm. pressure.

Following the above procedure of refluxing an appropriate amine with 1-benzyl-4-piperidone, the following compounds are obtained:

N - (1-benzyl-4-piperidylidene)-o-toluidine, boiling at about 176–185° C. at 0.05 mm. pressure.

N-(1-benzyl-4-piperidylidene)-m-toluidine, boiling at about 190–196° C. at 0.6 mm. pressure.

N-(1-benzyl-4-piperidylidene)-m-anisidine, boiling at about 180–190° C. at 0.1 mm. pressure.

N - (1-benzyl-4-piperidylidene)-p-anisidine, boiling at about 200–210° C. at 0.2 mm. pressure.

Example 2

A solution of n-butyl lithium, which is prepared by the reaction of 4.2 parts metallic lithium and 41.2 parts n-butyl bromide in a nitrogen atmosphere, in 160 parts of hexane, is cooled to about 15° C., after which a solution of 26.5 parts N-(1-benzyl-4-piperidylidene)aniline in 80 parts hexane is added portionwise. Upon completion of addition, the mixture is refluxed for 15 hours. After cooling, the reaction mixture is decomposed by the successive addition of 50 parts water and 120 parts 5 N hydrochloric acid. The formed precipitate is filtered off. The aqueous layer is separated from the filtrate and in combination with the filter cake is heated under reflux and filtered while hot. The undissolved solid is then dissolved in 80 parts of boiling acetone. Upon cooling, 1 - benzyl - 4 - butyl-4-anilinopiperidine dihydrochloride, melting at about 230.4–232° C. is obtained.

Substitution of ethyl lithium for the butyl derivative in the above procedure yields 1-benzyl-4-ethyl-4-anilinopiperidine dihydrochloride.

Example 3

To a suspension of 8 parts of lithium aluminum hydride in 200 parts of ether is added portionwise a solution of 26 parts of N-(1-benzyl-4-piperidylidene)aniline in 200 parts of anhydrous ether. The reaction mixture is stirred and refluxed for 5 hours. While still hot, it is decomposed by the addition of 250 parts of water. The mixture is acidified with 100 parts of 12 N hydrochloric acid to give a clear solution. The aqueous layer is separated and 64 parts of tartaric acid is added to this solution with stirring. The resultant solution is made strongly alkaline and extracted with 3 portions of benzene. The organic layer is dried over potassium carbonate and filtered, and the solvent is evaporated. The resultant residue is recrystallized from petroleum ether to give 1-benzyl-4-anilinopiperidine, melting at about 84.8–86° C.

If an equivalent quantity of the appropriate Schiff base is substituted for the N-(1-benzyl-4-piperidylidene)aniline and the above procedure is repeated, the following compounds are obtained:

1-benzyl-4-(o-toluidino)piperidine, melting at about 103–103.8° C.

1 - benzyl-4-(p-anisidino)piperidine, melting at about 65–66° C.

Dihydrochlordie salts of the 1-benzyl-4-(N-aminoaryl)piperidine derivatives are obtained by dissolving the residues of the above procedure in 240 parts acetone and bubbling into the solution anhydrous hydrogen chloride gas. The precipitated hydrochloride is filtered off.

Compounds obtained by substitution of an equivalent quantity of the appropriate Schiff base in the procedure of Examples 1 and 2 are:

1 - benzyl-4-(m-toluidino)piperidine dihydrochloride, melting at about 254–256.5° C.

1 - benzyl - 4-(m-anisidino)piperidine dihydrochloride, melting at about 203.5–220° C.

1 - benzyl - 4-(p-anisidino)piperidine dihydrochloride, melting at about 252–265° C.

Example 4

To a solution of 19.5 parts of 1-benzyl-4-anilinopiperidine in 160 parts of benzene is added portionwise a solution of 10 parts of acetic anhydride and 40 parts of benzene with stirring. After the mixture is refluxed for 2 hours, it is cooled and alkalized with 10% sodium hydroxide. The organic layer is separated, washed with water, dried and filtered, and the solvent is evaporated from the filtrate. From the oily residue, which is dissolved in petroleum ether, there is obtained, upon cooling, N - (1-benzyl-4-piperidyl)acetanilide, melting at about 107–109.2° C. with decomposition.

If 1-benzyl-4-(m-anisidino)piperidine, liberated upon evaporation of the solvent from the benzene extracts of an alkalized aqueous solution of 26 parts of the dihydrochloride salt, is dissolved in 160 parts of anhydrous benzene and the above procedure is followed, substituting this solution for the piperidine derivative and benzene of the previous paragraph, there is obtained N-(1-benzyl-4-piperidyl)-m-acetanisidide.

Example 5

By substitution of 20 parts of 1-benzyl-4-(m-toluidino)piperidine dihydrochloride in the procedure outlined in paragraph 1 of Example 4 and using an equivalent amount of a petroleum ether: diisopropyl ether solvent in the ratio of 40:16 parts in place of the ether, there is obtained N-(1-benzyl-4-piperidyl)-m-acetotoluidide, melting at about 73.8–74.4° C.

Example 6

To a solution of 28 parts of 1-benzyl-4-anilinopiperidine in 320 parts toluene is added portionwise 26 parts propionic anhydride in 120 parts toluene. The mixture is stirred and refluxed for 7 hours. After cooling, the mixture is made alkaline with excess 20% sodium hydroxide. The toluene layer is separated, dried, filtered, and the filtrate evaporated. The residue is dissolved in 40 parts petroleum ether. After cooling at about 0° C., N-(1-benzyl-4-piperidyl)propionanilide, melting at about 74–76° C. is obtained.

By substituting equivalent quantities of the appropriate amine in the above procedure, the following amides are obtained:

N-(1-benzyl-4-piperidyl)-o-propionotoluidide.
N-(1-benzyl-4-piperidyl)-m-propionanisidide.
N-(1-benzyl-4-piperidyl)-o-propionanisidide.

The hydrochloride salts of the above-mentioned compounds are obtained by dissolving the free base in an inert solvent (e.g. isopropyl ether) and introducing hydrogen chloride gas. The precipitated hydrochloride is filtered and recrystallized from 160 parts of acetone yielding, for example, N-(1-benzyl-4-piperidyl)-p-propionanisidine hydrochloride, melting at about 210–220° C.

Example 7

A mixture of 20 parts 1-benzyl-4-(3-toluidino)piperidine dihydrochloride, 13 parts benzene, and 200 parts propionic anhydride is refluxed for 6 hours. After cooling, the reaction mixture is made alkaline with excess 10% sodium hydroxide. The organic layer is separated, washed with water, dried, filtered, evaporated, and the residue dissolved in 40 parts petroleum ether. After keeping the solution at room temperature long enough to allow crystallization to occur, N-(1-benzyl-4-piperidyl)-m-propionotoluidide, melting at about 73.5–74.5° C. is obtained.

Example 8

A mixture of 14 parts of 1-benzyl-4-butyl-4-(N-anilino)piperidine dihydrochloride, 14 parts of propionic anhydride and 80 parts toluene is stirred and refluxed for 40 hours. After cooling, the reaction mixture is made alkaline with 10% sodium hydroxide. The aqueous layer is separated, and extracted twice with 40 parts toluene. After the combined organic layers are washed with 100 parts of water, dried over magnesium sulfate, and the toluene solution evaporated, the residue obtained is dissolved in 400 parts of diisopropyl ether. Hydrogen chloride gas is introduced into this solution. The precipitated hydrochloride is filtered off and dried to yield N-(1-benzyl-4-butyl-4-piperidyl)propionanilide hydrochloride, melting at about 80–100° C.

Substitution of 1-benzyl-4-ethyl-4-(N-anilino)piperidine dihydrochloride for the dihydrochloride salt of the above procedure affords N-(1-benzyl-4-ethyl-4-piperidyl)propionanilide hydrochloride.

Example 9

A mixture of 13 parts 1-benzyl-4-anilinopiperidine, 12 parts butyric anhydride, and 160 parts anhydrous benzene is stirred and refluxed for 16 hours. The reaction mixture is made alkaline with 10% sodium hydroxide. The organic layer is separated, dried over magnesium sulfate, filtered and the filtrate evaporated. After dissolving this residue in 320 parts diisopropyl ether, hydrogen chloride gas is introduced. The precipitated hydrochloride is filtered off, boiled in 120 parts ethyl acetate, and filtered again, yielding N-(1-benzyl-4-piperidyl)butyranilide hydrochloride, melting at about 230–231° C.

*Example 10*

A solution of 15.6 parts of cyclopropanecarbonyl chloride in 60 parts of toluene is added portionwise to a solution of 30 parts of 1-benzyl-4-anilinopiperidine in 120 parts of toluene. When the addition is complete, the mixture is stirred for 30 minutes at room temperature, and then refluxed for 4 hours. Two hundred parts of water is added to the cooled mixture and it is refluxed for 4 hours, then cooled to room temperature to give N-(1-benzyl-4-piperidyl) - N - phenylcyclopropanecarboxamide hydrochloride, melting at about 255–258° C.

*Example 11*

Thirty-one parts of 1-benzyl-4-anilinopiperidine is stirred in 120 parts of pyridine at room temperature. To this solution is added a solution of 18 parts of ethyl chloroformate in 32 parts of ether. After the addition is complete, the mixture is stirred at room temperature for 16 hours, and then agitated again on the water bath at 60–65° C. The mixture is cooled. The solid is filtered off, washed with acetone, then recrystallized from water to give ethyl N-(1-benzyl-4-piperidyl)-N-phenylcarbamate hydrochloride, melting at about 231–233° C.

By substitution of the appropriate alkyl chloroformate and repeating the above procedure, one obtains:

Methyl N - (1-benzyl-4-piperidyl)-N-phenylcarbamate hydrochloride.

Butyl N - (1 - benzyl-4-piperidyl)-N-phenylcarbamate hydrochloride.

*Example 12*

To a solution of 15 parts of phosgene in 56 parts of toluene is added portionwise a solution of 13.3 parts of 1-benzyl-4-anilinopiperidine in 24 parts of toluene. The resultant mixture is stirred at room temperature for 20 minutes and then heated on a water bath for 2 hours. A solid precipitates from the cooled mixture, and it is filtered off and washed with diisopropyl ether and dried to give N-(1-benzyl-4-piperidyl)-N-phenylcarbamyl chloride hydrochloride, melting at about 178–185° C.

*Example 13*

To a stirred mixture of 60 parts of piperidine in 120 parts of benzene is added portionwise 25 parts of N-(1-benzyl-4-piperidyl)-N-phenylcarbamyl chloride hydrochloride. The mixture is refluxed for 3 hours and then cooled, and 200 parts of water added. The organic layer is separated, washed 3 times with 200 parts of water, dried over potassium carbonate and filtered, and the solvent is evaporated. The residue is recrystallized from petroleum ether to give N-(1-benzyl-4-piperidyl)-N-phenyl-N', N'-pentamethyleneurea, melting at about 115–116° C.

If equivalent quantities of the appropriate amine are substituted for piperidine and the above procedure is repeated, the following compounds are obtained:

N - (1-benzyl-4-piperidyl)-N-phenyl-N',N'-tetramethyleneurea, melting at about 92–95.5° C.

N - (1 - benzyl - 4-piperidyl)-N-phenyl-N',N'-(3-oxapentamethylene)urea, melting at about 104–106° C.

*Example 14*

A solution of 16.5 parts N-(1-benzyl-4-piperidyl)acetanilide in 160 parts ethanol is hydrogenated at atmospheric pressure at room temperature in the presence of 3 parts of 10% palladium-on-charcoal catalyst. Hydrogenation is stopped after the calculated amount of hydrogen gas is taken up. The reaction mixture is filtered and the filtrate evaporated. After adding dilute hydrochloric acid to the residue, the aqueous solution is made alkaline with 10% sodium hydroxide and extracted with benzene. The organic layer is separated, then dried over potassium carbonate and evaporated. The residue is dissolved in 40 parts of diisopropyl ether and allowed to stand at room temperature. Thus, N-(4-piperidyl)acetanilide, melting at about 129–130° C. crystallizes out. The hydrochloride salt is obtained by passing hydrogen chloride gas through an ether solution of the amine.

If equivalent quantities of the appropriate piperidyl amide are substituted for the N-(1-benzyl-4-piperidyl) acetanilide in the above procedure, the following compounds are obtained:

N-(4-piperidyl)propionanilide, melting at about 83–85° C.

N-(4-piperidyl)butyranilide, melting at about 93.4–95.8° C.

N-(4-piperidyl)-N-phenylcyclopropanecarboxamide hydrochloride, melting at about 238–239° C.

N-(4-piperidyl)-o-propionotoluidide.

N - (4 - piperidyl) - p-propionotoluidide hydrochloride, melting at about 176–177° C.

Ethyl N-(4-piperidyl)-N-phenylcarbamate hydrochloride, melting at about 225–227° C., with decomposition.

Methyl N-(4-piperidyl)-N-phenylcarbamate hydrochloride.

Butyl N-(4-piperidyl)-N-phenylcarbamate hydrochloride.

N - (4-piperidyl)-N-phenyl-N',N'-dimethylurea hydrochloride, melting at about 242–246° C.

N - (4 - piperidyl)-N-phenyl-N',N'-tetramethyleneurea hydrochloride, melting at about 266–267° C. The free base of this compound melts at about 110.6–113° C.

N - (4-piperidyl)-N-phenyl-N',N'-pentamethyleneurea, melting at about 101–103° C.

N - (4 - piperidyl)-N-phenyl-N',N'-(3-oxapentamethylene)-urea hydrochloride, melting at about 254–256.5° C.

N-(4-piperidyl)-m-acetanisidide, melting at about 110–112.8° C.

N-(4-piperidyl)-m-propionanisidide.
N-(4-piperidyl)-m-propionotoluidide.
N-(4-piperidyl)-m-acetotoluidide.
N-(4-butyl-4-piperidyl)propionanilide.
N-(4-ethyl-4-piperidyl)propionanilide.

*Example 15*

A solution of 8.5 parts of N-(1-benzyl-4-piperidyl)-p-propionanisidide hydrochloride is hydrogenated as described in paragraph 1 of the previous example. After filtration of the reaction mixture and evaporation of the filtrate, the residue is dissolved in 250 parts of water, made alkaline with sodium hydroxide and extracted with benzene. The organic layer is separated, dried over potassium carbonate, filtered and evaporated. The residue is dissolved in 200 parts of diisopropyl ether, and evaporated to yield oily N-(4-piperidyl)-p-propionanisidide.

*Example 16*

A mixture of 5.2 parts β-cyclohexylethyl bromide 5.9 parts N-(4-piperidyl)propionanilide, 10 parts of sodium carbonate, 0.05 part potassium iodide in 200 parts 4-methyl-2-pentanone is stirred and refluxed for 36 hours. After cooling, 200 parts of water are added with stirring. The organic layer is separated, dried, filtered and evaporated. The oily residue is dissolved in 280 parts diisopropyl ether, then hydrogen chloride gas is introduced into the mixture. The precipitated hydrochloride is filtered off and recrystallized from 40 parts acetone to yield N-[1-(β-cyclohexylethyl)-4-piperidyl]propionanilide hydrochloride, melting at about 204–106° C. This compound has the structural formula

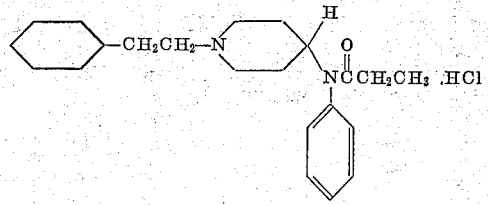

Example 17

To the stirred solution of 5 parts of N-(4-piperidyl)propionanilide, 6.85 parts sodium carbonate, 0.05 part potassium iodide in 120 parts hexone is added portionwise a solution of 3.8 parts β-phenylethyl chloride in 24 parts 4-methyl-2-pentanone. The mixture is stirred and refluxed for 27 hours. The reaction mixture is filtered while hot, and the filtrate is evaporated. The oily residue is dissolved in 160 parts diisopropyl ether and the solution is filtered several times until clear, then concentrated to a volume of about 70 parts. The residue is then cooled for about 2 hours at temperatures near 0° C. to yield N-[1-(β-phenylethyl)-4-piperidyl]propionanilide, melting at about 83–84° C.

Substitution of β-(p-fluorophenyl)ethyl bromide for the chloride of the above procedure yields N-{1-[β-(p-fluorophenyl)ethyl]-4-piperidyl}propionanilide, melting at about 104–105° C.

Substitution of β-(p-iodophenyl)ethyl chloride yields N-{1-[β-(p-iodophenyl)ethyl]-4-piperidyl}propionanilide.

Substitution of β-(m-bromophenyl)ethyl bromide for the halogen of paragraph 1 yields N-{1-[β-(m-bromophenyl)ethyl] - 4 - piperidyl}propionanilide, when reflux time is increased from 36 to 48 hours.

Substitution of β-(p-chlorophenyl)ethyl chloride for the chloride of paragraph 1 of this example yields N-{1-[β-(p-chlorophenyl)ethyl]-4-piperidyl}propionanilide, melting at about 73–74° C.

Substitution of β-(p-methoxyphenyl)ethyl chloride for the chloride of paragraph 1 of this example yields N-{1-[β-(p-anisyl)ethyl]-4-piperidyl}propionanilide, melting at about 97–98° C.

Substitution of β-(p-nitrobenzyl)ethyl chloride for the chloride of paragraph 1 in this example yields N-{1-[β-(p-nitrophenyl)ethyl]-4-piperidyl}propionanilide, melting at about 114–119° C., when reflux time is reduced from 36 to 24 hours.

Substitution of β-(2-thienyl)ethyl chloride for the phenylethyl chloride of the above procedure yields N-{1-[β-(2-thienyl)ethyl]-4-piperidyl}propionanilide, melting at about 62–63° C.

Substitution of N-(4-piperidyl)propionotoluidide for the N-substituted amide of paragraph 1 yields N-[1-(β-phenylethyl)-4-piperidyl]-p-propionotoluidide, melting at about 136–138° C.

Substitution of N - (4-piperidyl)butyranilide for the amide of paragraph 1 yields N-[1-(β-phenylethyl)-4-piperidyl]butyranilide, melting at about 90–91° C.

Substitution of β-(m-methoxyphenyl)ethyl chloride of paragraph 1 yields N-{1-[β-(m-anisyl)ethyl]-4-piperidyl}propionanilide.

Example 18

To a stirred mixture of 5.66 parts N-(4-piperidyl)-o-propionotoluidide, 7.3 parts sodium carbonate, 0.05 part potassium iodide and 120 parts 4-methyl-2-pentanone is added portionwise a solution of 4.1 parts 2-phenyl-1-chloroethane in 16 parts 4-methyl-2-pentanone. The mixture is stirred and refluxed for 36 hours. While hot, the reaction mixture is filtered and the filtrate evaporated. After dissolving the residue in 200 parts diisopropyl ether, the solution is filtered several times until clear. The filtrate is diluted with 320 parts of diisopropyl ether and hydrogen chloride gas is introduced into the solution. The precipitated hydrochloride is filtered off and stirred in 56 parts of acetone. The acetone solution is filtered yielding a residue of N-[1-(β-phenylethyl)-4-piperidyl]-o-propionotoluidide hydrochloride, melting at about 194–196° C.

Substitution of the appropriate amides for the N-(4-piperidyl)-o-propionotoluidide in the above example yields:

N-[1-(β-phenylethyl)-4-piperidyl]-m-propionotoluidide hydrochloride, melting at about 210–218° C.

N-[1-(β-phenylethyl)-4-piperidyl]-m-acetotoluidide hydrochloride, melting at about 235.5–241° C.

N - [1-(β-phenylethyl)-4-piperidyl]butyranilide hydrochloride, melting at about 210–211° C. Reflux time is increased to 80 hours.

N-[1-(β-phenylethyl)-4-piperidyl] - p-propionanisidide hydrochloride, melting at about 210–211.5° C.

By substituting β-(2-fury)ethyl chloride for the 2-phenyl-1-chloroethane and N-(4-piperidyl)propionanilide for the amide of paragraph 1 in this example and repeating the procedure of this example, there is obtained:

N-{1-[β-(2-furyl)ethyl]-4-piperidyl}propionanilide hydrochloride, melting at about 232.5–233.5° C.

N-[1-(β-phenyl)ethyl-4-butyl - 4-piperidyl]propionanilide hydochloride, melting at about 168–169.8° C.

N-[1-(β-phenyl)ethyl-4-ethyl - 4-piperidyl]propionanilide hydrochloride.

Example 19

A mixture of 3.5 parts β-phenylethyl chloride, 6 parts N-(4-piperidyl)-N-phenyl-N',N'-dimethylurea hydrochloride, 0.05 part potassium iodide in 160 parts hexone is stirred, then refluxed for 45 hours. After cooling, the reaction mixture is filtered, the filtrate is evaporated. The residue is dissolved in 160 parts of diisopropyl ether and filtered. Upon evaporation of the filtrate, solid N-[1-(β-phenylethyl)-4-piperidyl]-N-phenyl-N',N'-dimethylurea is precipitated, which, upon recrystallization from diisopropyl ether, melts at about 115–116° C.

Example 20

A mixture of 4.3 parts 2-phenyl-1-bromopropane, 10 parts N-(4-piperidyl)propionanilide, 0.05 part potassium iodide in 80 parts of toluene is refluxed at 150° for 65 hours. After addition of 150 parts of water, the organic layer is separated and washed with water, dried, filtered and evaporated. The residue is dissolved in 200 parts diisopropyl ether and dry hydrogen chloride gas passed into the solution. The precipitated hydrochloride is filtered off and recrystallized from 20 parts isopropanol to yield N-[1-(β-methyl-β-phenyl)ethyl-4-piperidyl]propionanilide hydrochloride, melting at about 226–229.6° C. This compound has the formula:

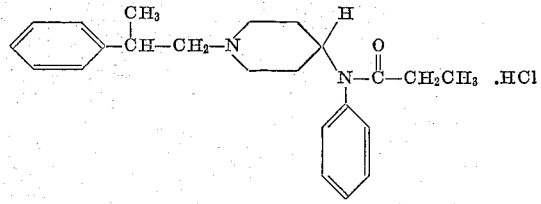

Substitution of 1-phenyl-2-bromopropane for the bromide of the above example and following the same procedure yields N-[1-(α-methyl-β-phenyl)ethyl-4-piperidyl]propionanilide hydrochloride, melting at about 272.8–273.6° C.

Example 21

A mixture of 6 parts 4-vinyl-pyridine pyridyl, 3.1 parts N-(4-piperidyl)propionanilide, and 160 parts butanol is stirred and refluxed for 20 hours. The residue remaining after evaporation of the solvent is dissolved in xylene and evaporated again. The oily residue is dissolved in diisopropyl ether. After cooling the solution at about −15° C., N-{1-[β-(4-pyridyl)ethyl]-4-piperidyl}propionanilide, melting at about 123–125° C. is obtained.

Example 22

To a stirred mixture of 4.2 parts N-(4-piperidyl)-m-acetanisidide, 6.4 parts sodium carbonate, 0.5 part potassium iodide, and 120 parts 4-methyl-2-pentanone, a solution of 4.9 parts β-phenylethyl chloride in 24 parts hexone is added portionwise. After mixing, the mixture is reflexed for 39 hours. After cooling the reaction mixture, 70 parts of water are added. The aqueous layer is separated and extracted once more with toluene. The combined organic layers are dried over magnesium sulfate, filtered, and the filtrate evaporated. The oily residue is dissolved in 32 parts diisopropyl ether and filtered until clear. After cooling to about −15° C., N-[1-(β-phenylethyl)-4-piperidyl]-m-acetanisidide, melting at about 94.5–96° C., is obtained.

Substitution of the appropriate amide or amide hydrochloride for the N-(4-piperidyl)acetanisidide of the above example yields:

Ethyl N - [1-(β-phenyl)ethyl-4-piperidyl]-N-phenylcarbamate, melting at about 110–110.8° C., when the reflux time is increased to 60 hours.

Methyl N - [1-(β-phenyl)ethyl-4-piperidyl]-N-phenylcarbamate.

Butyl N - [1-(β-phenyl)ethyl-4-piperidyl]-N-phenylcarbamate.

N - [1-(β-phenylethyl)-4-piperidyl]acetanilide, melting at about 96–97° C.

N - [1 - (β-phenylethyl)-4-piperidyl]-N-phenyl-N',N'-tetramethyleneurea, melting at about 133–134° C.

N - [1 - (β-phenylethyl)-4-piperidyl]-N-phenyl-N',N'-pentamethyleneurea, melting at about 114.5–116° C.

N - [1 - (β-phenylethyl)-4-piperidyl]-N-phenyl-N',N'-(3-oxapentamethylene)urea, melting at about 99–100° C.

Substitution of (β-cyclohexyl)ethyl bromide for the chloride of paragraph 1 of this example and N-(4-piperidyl) - N-phenylcyclopropanecarboxamide hydrochloride for the amide yields N-[1-(β-cyclohexylethyl)-4-piperidyl] - N - phenylcyclopropanecarboxamide, melting at about 102–102.5° C.

Substitution of the β-cyclohexylethyl bromide and N-(4-piperidyl)-N-phenyl-N',N'-tetramethyleneurea hydrochloride for, respectively, the phenylethyl chloride and amide of paragraph 1 yields N-[1-(β-cyclohexylethyl)-4-piperidyl]-N-phenyl-N',N'-tetramethyleneurea, melting at about 106–108° C.

Example 23

To a stirred mixture of 7.8 parts N-(4-piperidyl)-m-propionanisidide, 9.5 parts sodium carbonate, 0.05 part potassium iodide, and 120 parts 4-methyl-2-pentanone is added portionwise a solution of 5.27 parts β-phenylethyl chloride in 16 parts 4-methyl-2-pentanone. After stirring, the solution is refluxed for 36 hours and then filtered while hot. After evaporation of the filtrate, the residue is dissolved in 240 parts diisopropyl ether, and the solution is filtered several times until clear. The filtrate is evaporated in vacuo, and the residue dissoved in 150 parts isopropanol. Next, a solution of 3.8 parts oxalic acid dihydrate in 16 parts isopropanol is added. After filtration, the sticky precipitate is recrystallized from 120 parts of isopropanol and cooled to room temperature yielding N-[1-(β-phenyl)ethyl-4-piperidyl]-m-propionanisidide oxalate, melting at about 178.4–179.2° C.

Example 24

A mixture of 2.8 parts β-phenylethyl chloride, 5 parts N - (4 - piperidyl)-N-phenylcyclopropanecarboxamide hydrochloride, 5.7 parts sodium carbonate, 0.05 part potassium iodide, and 176 parts 4-methyl-2-pentanone is stirred and refluxed for 40 hours. After cooling, the reaction mixture is filtered, then the filtrate evaporated. After dissolving the residue in 56 parts diisopropyl ether and cooling at room temperature, N-[1-(β-phenylethyl)-4 - piperidyl]-N-phenylcyclopropanecarboxamide is obtained, melting at about 119.5–120.4° C.

Example 25

A solution of 4 parts N-{1-[β-(p-nitro)phenyl]-ethyl-4-piperidyl}-propionanilide in 40 parts C is reduced by catalytic hydrogenation at room temperature and normal pressure in the presence of 0.1 part of Adams catalyst. After the calculated amount of hydrogen is taken up, hydrogenation is stopped. The catalyst is filtered off, and the filtrate is evaporated. The residue is dissolved in 25 parts of hot diisopropyl ether. After cooling the solution, a precipitate is obtained which is filtered off and dried to yield N - {1-[β-(p-amino)phenyl]ethyl-4-piperidyl}-propionanilide, melting at about 150–151° C.

Example 26

The free base which remains upon evaporation of the solvent from an aqueous, alkaline benzene solution of 8.5 parts of ethyl N-(4-piperidyl)-N-phenylcarbamate hydrochloride is extracted with 24 parts butanol 3 times, and the organic layer dried. After addition of 3.1 parts 2-vinyl-pyridine in 88 parts butanol and stirring, the mixture is refluxed for 24 hours. The solvent is evaporated, and the residue dissolved in 32 parts isopropanol. Storage at room temperature of this solution, after addition of 5.5 parts oxalic acid dihydrate in 8 parts isopropanol, yields 11.2 parts of the crude oxalate, which can be crystallized from 25 parts water. After cooling, the oxalate of the unreacted phenylcarbamate derivative is precipitated. After filtration, the mother liquor is made alkaline with 10% sodium hydroxide and extracted with toluene. The organic layer is dried, filtered and evaporated. Crystallization from 16 parts diisopropyl ether yields ethyl N-{1-[β - (2 - pyridyl)ethyl]-4-piperidyl}-N-phenylcarbamate, melting at about 82—83.2° C.

I claim:

1. A compound of the formula

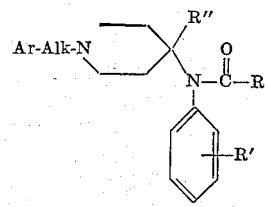

wherein Ar is a member of the class consisting of cyclohexyl, phenyl, halophenyl, methoxyphenyl, aminophenyl, nitrophenyl, pyridyl, furyl and thienyl; Alk is a member of the class consisting of ethylene and propylene; R is a member of the class consisting of lower alkyl, lower alkoxy, dimethylamino, cyclopropyl, morpholino, pyrrolidino and piperidino; R' is a member of the class consisting of hydrogen, methyl and methoxy; and R'' is a member of the class consisting of hydrogen and lower alkyl.

2. A compound of the formula

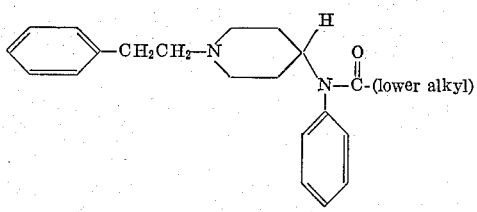

3. N-[1-(β-phenylethyl)-4-piperidyl]propionanilide.
4. N-[1-(β-phenylethyl)-4-piperidyl]butyranilide.
5. A compound of the formula

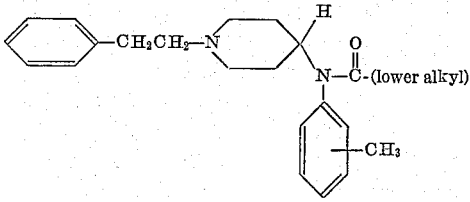

6. N - [1 - (β - phenylethyl) - 4 - piperidyl] - o - propionotoluidide.

7. A compound of the formula

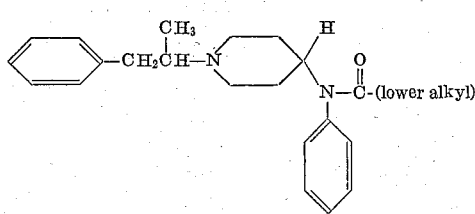

8. N - [1 - (α - methyl - β - phenylethyl) - 4 - piperidyl]proprionanilide.

9. A compound of the formula

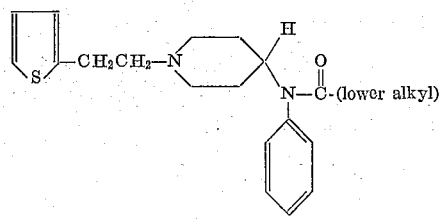

10. N - [1 - (β - thienylethyl) - 4 - piperidyl]proprionanilide.

11. A compound of the formula

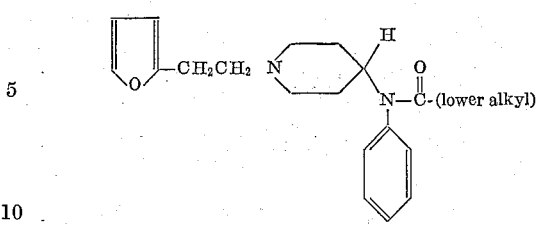

12. N - [1 - (β - furylethyl) - 4 - piperidyl]proprionanilide.
13. N - [1 - (β - phenylethyl) - 4 - piperidyl] - N-phenylpropanecarboxamide.
14. N - [1 - (β - phenylethyl) - 4 - butyl - 4 - piperidyl]propionanilide.
15. N - [1 - (β - cyclohexylethyl) - 4 - piperidyl]propionanilide.
16. N - [1 - (β - cyclohexylethyl) - 4 - piperidyl] - N-phenylcyclopropanecarboxamide.

References Cited in the file of this patent
UNITED STATES PATENTS

| | | |
|---|---|---|
| 2,824,875 | Elpern | Feb. 25, 1958 |
| 2,914,532 | Elpern | Nov. 24, 1959 |
| 2,962,501 | Cutler et al. | Nov. 29, 1960 |
| 3,004,977 | Janssen | Oct. 17, 1961 |
| 3,012,030 | Janssen | Dec. 5, 1961 |

OTHER REFERENCES

Nazarov et al.: Chemical Abstracts, vol. 54, page 8812, 1960.

UNITED STATES PATENT OFFICE
CERTIFICATE OF CORRECTION

Patent No. 3,164,600                        January 5, 1965

Paul A. J. Janssen

It is hereby certified that error appears in the above numbered patent requiring correction and that the said Letters Patent should read as corrected below.

Column 2, line 1, for "(e.e. butanol)" read -- (e.g. butanol) --; column 3, line 41, for "Dihydrochlordie" read -- Dihydrochloride --; line 48, for "of Examples 1 and 2 are:" read -- of paragraphs 1 and 5 of this Example 3 are: --; column 8, line 58, strike out "pyridyl"; line 69, for "0.5" read -- 0.05 --; column 12, lines 13 and 14, for "-N-phenylpropane-carboxamide" read -- -N-phenylcyclopropanecarboxamide --; lines 19 and 20, for "-N-phenylcyclopropanecarboxamide" read -- -N-phenyl-cyclopropanecarboxamide --.

Signed and sealed this 14th day of September 1965.

(SEAL)
Attest:

ERNEST W. SWIDER                        EDWARD J. BRENNER
Attesting Officer                        Commissioner of Patents